United States Patent
Lhommeau et al.

(10) Patent No.: US 11,371,383 B2
(45) Date of Patent: Jun. 28, 2022

(54) SYSTEM FOR INSPECTING COMPONENTS OF A TURBOJET ENGINE USING RADIO-FREQUENCY IDENTIFICATION

(71) Applicant: SAFRAN AIRCRAFT ENGINES, Paris (FR)

(72) Inventors: Tony Alain Roger Joël Lhommeau, Moissy-Cramayel (FR); Guillaume Philippe Camille Bastard, Moissy-Cramayel (FR); Hervé Jean Albert Mouton, Moissy-Cramayel (FR); Philippe Roger Jacques Canteau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/264,127

(22) PCT Filed: Jul. 24, 2019

(86) PCT No.: PCT/FR2019/051834
§ 371 (c)(1),
(2) Date: Jan. 28, 2021

(87) PCT Pub. No.: WO2020/025882
PCT Pub. Date: Feb. 6, 2020

(65) Prior Publication Data
US 2021/0310368 A1    Oct. 7, 2021

(30) Foreign Application Priority Data

Jul. 31, 2018  (FR) ...................................... 18 57169

(51) Int. Cl.
*F01D 25/24*  (2006.01)
*F01D 21/00*  (2006.01)
(Continued)

(52) U.S. Cl.
CPC ........... *F01D 21/003* (2013.01); *B64D 29/08* (2013.01); *B64F 5/40* (2017.01); *G06K 19/0723* (2013.01);
(Continued)

(58) Field of Classification Search
CPC .... F01D 21/003; F01D 25/24; F05D 2230/72; F05D 2260/80; F05D 2260/83;
(Continued)

(56) References Cited

U.S. PATENT DOCUMENTS 9,071,888 B2 * 6/2015 Subramanian .......... F01D 17/02
9,507,982 B2 * 11/2016 Mylaraswamy ........ H04W 4/80
(Continued)

FOREIGN PATENT DOCUMENTS

EP    2 224 379 A1    9/2010
EP    3 196 425 A1    7/2017

OTHER PUBLICATIONS

International Search Report dated Jan. 15, 2019 in PCT/FR2019/051834 filed Jul. 24, 2019, 3 pages.
(Continued)

*Primary Examiner* — Ninh H. Nguyen
(74) *Attorney, Agent, or Firm* — Oblon, McClelland, Maier & Neustadt, L.L.P.

(57) ABSTRACT

A system and a method for inspecting components of a turbojet engine using RFID tags and an associated interrogator device. The inspection system includes at least one RFID tag associated with a component of the turbojet engine and an interrogator device arranged so as to be able to communicate with the RFID tag, the interrogator device being equipped with an RFID antenna arranged so as to be able to be inserted into a nacelle compartment of the turbojet engine through an inspection opening intended for the passage of an endoscope probe.

15 Claims, 2 Drawing Sheets

(51) Int. Cl.
  *B64F 5/40* (2017.01)
  *B64D 29/08* (2006.01)
  *G06K 19/07* (2006.01)
  *G06K 19/077* (2006.01)

(52) U.S. Cl.
  CPC .. *G06K 19/07775* (2013.01); *F05D 2220/323* (2013.01); *F05D 2230/72* (2013.01); *F05D 2260/80* (2013.01)

(58) Field of Classification Search
  CPC .............. B64D 29/08; G06K 19/0723; G06K 19/07775; G06K 2007/10524; H01Q 1/2216
  See application file for complete search history.

(56) References Cited

U.S. PATENT DOCUMENTS

| | | | |
|---|---|---|---|
| 10,051,345 B2 * | 8/2018 | Mantese | ............... F01D 21/003 |
| 10,489,991 B2 * | 11/2019 | Griffith | ............ G06K 19/07758 |
| 2007/0018793 A1 | 1/2007 | Stewart et al. | |
| 2007/0114280 A1 | 5/2007 | Coop et al. | |
| 2008/0125950 A1 | 5/2008 | Brown | |
| 2010/0019882 A1 | 1/2010 | Stern et al. | |
| 2010/0219942 A1 | 9/2010 | Lee | |
| 2011/0280279 A1 | 11/2011 | Gregory et al. | |
| 2013/0125386 A1 | 5/2013 | Gregory et al. | |

OTHER PUBLICATIONS

French Preliminary Search Report dated May 29, 2019 in FR 1857169 filed Jul. 31, 2018, (with Translation of Category of Cited Documents), 2 pages.

* cited by examiner

SYSTEM FOR INSPECTING COMPONENTS OF A TURBOJET ENGINE USING RADIO-FREQUENCY IDENTIFICATION

TECHNICAL FIELD

The invention lies in the field of the maintenance of aircrafts and, more precisely, in the field of the monitoring of components mounted in a turbojet engine. It relates to a system and a method for inspecting components of a turbojet engine, for which the inspection is performed by means of an interrogator device arranged to be able to communicate with RFID tags associated with said components.

PRIOR ART

The maintenance of an aircraft involves, in some situations, identifying the components equipping a turbojet engine. This identification is based on information relating to the components, such as the serial number, the component number or the date of installation of the component. Conventionally, this information is attached to the components equipping a turbojet engine by etching these components or by fixing an identification plate. After integrating the components in the turbojet engine, reading the information may be difficult or even impossible without dismantling these components or surrounding components. Furthermore, the components of a turbojet engine are housed in a nacelle and are accessible only after opening of a cover. Strict regulations control work on a turbojet engine and in particular the opening of these nacelle covers. It is in particular necessary to follow a specific protocol having a negative impact on the work duration. In addition, opening the nacelle covers may be prevented by strong winds, making it impossible to identify the components.

One solution for accessing information relating to the components equipping a turbojet engine without having to open a nacelle cover consists of equipping the components with RFID tags containing this information. Passing an interrogator reader in the vicinity of the RFID tags makes it possible to collect the information. The data are exchanged by means of electromagnetic waves at frequencies lying between approximately 100 kHz (kilohertz) and a few gigahertz. A radio-frequency interrogation signal is first of all emitted by the interrogator reader towards each of the RFID tags. Each RFID tag situated in a vicinity sufficiently close to the interrogator reader for receiving the radio-frequency interrogation signal resends to the interrogator reader a response radio-frequency signal containing the information contained in a chip of the RFID tag. This solution based on radio-identification makes it possible to access, easily and quickly, the information associated with a plurality of components of a turbojet engine, including when these components are surrounded by other components in a dense environment. It is in particular described, in the patent application EP 3 196 425 A1, as a solution for communicating, to mobile apparatus external to the aircraft, information relating to an oil level in a turbine engine. Nevertheless, the exchange of electromagnetic signals between components of a turbojet engine and the outside is greatly interfered with by the wall of the nacelle enclosing the turbojet engine. This wall is generally composed of a multilayer structure that is at least partially electrically conductive. It is for example formed by a first layer of carbon composite, a second honeycomb layer, a third layer of carbon composite and a fourth layer of bronze meshes. The wall of the nacelle then forms a Faraday cage with an attenuation of around 40 to 80 dB. This electromagnetic barrier could possibly be passed by greatly increasing the power of the signals exchanged between the interrogator reader and the RFID chips. However, this power must be limited because of the risk of interference with other equipment on the aircraft, or even with equipment on other aircraft.

Having regard to the above, the objective of the invention is to provide a solution for easily identifying the components of a turbojet engine and optionally obtaining information relating to these components without having to dismantle part of the turbojet engine and even without having to open a nacelle cover. Another objective of the invention is to provide a device, the design, manufacture and maintenance costs of which are compatible with use on an industrial scale.

DESCRIPTION OF THE INVENTION

For this purpose, the invention is based on radio-identification technology, also referred to as RFID (radio-frequency identification) technology, with the use of an interrogator reader including an antenna arranged to be able to be inserted in the nacelle of a turbojet engine without requiring the opening of a cover. An aircraft nacelle includes in fact, conventionally, one or more inspection openings provided for passing an endoscope probe and allowing visual inspection of the turbojet engine.

More precisely, the object of the invention is a system for inspecting components of a turbojet engine, the turbojet engine being housed in a nacelle compartment delimited by a nacelle wall, the nacelle wall including an inspection opening suitable for allowing passage of an endoscope probe, the turbojet engine including at least one component equipped with an RFID tag, the inspection system comprising an interrogator device equipped with an RFID antenna, the interrogator device being arranged to be able to communicate with the RFID tag by means of the RFID antenna, the RFID antenna being arranged to be able to be introduced into the nacelle compartment through the inspection opening.

Communication between an interrogator device, also referred to as an "RFID reader", and an RFID tag conventionally involves the transmission, from the interrogator device to the RFID label, of a radio-frequency interrogation and transmission signal and, from the RFID tag to the interrogator device, a radio-frequency response signal encoding information contained in an electronic chip of the RFID tag. The radio-frequency signals have for example frequencies in a range lying between 860 MHz (megahertz) and 960 MHz. RFID technology may be passive, active or semi-active. A passive-technology RFID tag is solely supplied by induction via the electromagnetic signal emitted by the interrogator device. This signal makes it possible both to power the RFID tag and to transmit thereto a request for the sending of the information contained in an electronic chip of the RFID tag. An active-technology RFID tag is equipped with or associated with a battery enabling it to supply the necessary energy for sending a signal containing the information from the electronic chip. A semi-active-technology RFID tag is also equipped or associated with a battery; however, the energy supplied by the battery is solely used for storing information in the electronic chip, and not for the sending of the signal containing this information.

According to a first branch of the invention, the inspection system further comprises a positioning RFID tag disposed in the nacelle compartment so as to be able to be detected by the interrogator device when the RFID antenna is introduced into the nacelle compartment through the inspection opening. The inspection system is then configured to enable the interrogator device to emit a radio-frequency interrogation signal with a power below or equal to a first threshold when it has not detected the positioning RFID tag and to enable the interrogator device to emit a radio-frequency interrogation signal with a power higher than or equal to a second threshold when it has detected the positioning RFID tag. The second threshold is strictly higher than the first threshold. Preferably, the interrogator device and the positioning RFID tag are arranged so that the positioning RFID tag can be detected by the interrogator device only when the RFID antenna is introduced into the nacelle compartment. Typically, the interrogator device detects the positioning RFID tag when it receives a radio-frequency response signal from it. The positioning RFID tag thus forms a positioning marker and the interrogator device a positioning sensor.

The first threshold may be between 50 mW and 2 W. It is preferably equal to 500 mW in order to limit the risk of interference with other electromagnetic signals.

The second threshold can be determined so that, outside the nacelle compartment, after attenuation by the nacelle wall, the radio-frequency interrogation signal has a power below or equal to the first threshold. The radio-frequency interrogation signal attenuated by the nacelle wall can thus have a power of between 50 mW and 2 W, preferably less than or equal to 500 mW. The second threshold is for example between 2 W and 10 W. By passing through the nacelle wall with an attenuation of around 40 dB to 80 dB, the radio-frequency interrogation signal then has a power appreciably less than 2 W outside the nacelle compartment.

According to a second branch of the invention, the inspection system further comprises a positioning marker and a positioning sensor both arranged so that the positioning marker is detected by the positioning sensor when the RFID antenna is introduced into the nacelle compartment through the inspection opening. The inspection system is then configured to enable the interrogator device to emit a radio-frequency interrogation signal with a power above or equal to a predetermined threshold only when the positioning sensor has detected the positioning marker. Preferably, the positioning marker and the positioning sensor are arranged so that the positioning marker can be detected by the positioning sensor only when the RFID antenna is introduced into the nacelle compartment through the inspection opening.

According to a particular embodiment, the predetermined threshold has a zero value. In other words, no radio-frequency interrogation signal can be emitted before the positioning sensor has detected the positioning marker. The inspection system is then configured to enable the interrogator device to emit a radio-frequency interrogation signal only when the positioning sensor has detected the positioning marker.

According to another particular embodiment, the predetermined threshold is determined so that, outside the nacelle compartment, after attenuation by the nacelle wall, the radio-frequency interrogation signal has a power of less than or equal to 2 W, preferably less than or equal to 500 mW. The predetermined threshold is for example between 2 W and 10 W.

Various technologies can be used for producing the positioning sensor and the positioning marker. In particular, the positioning marker may be a bar code, or a 2D code such as a FLASH code or a QR code (registered trademarks). The positioning sensor is then an optical reader able to read a bar code or a 2D code. The bar code and the optical reader make it possible to identify an inspection opening and to inform the interrogator device that it is at the appropriate inspection opening.

The bar code or the 2D code is advantageously disposed on an external surface of the nacelle wall, in proximity to the inspection opening, the optical reader being disposed in the vicinity of the RFID antenna. Such an arrangement makes it possible both to ensure a bijective relationship between each inspection opening and a bar bode or a 2D code and to ensure that the RFID antenna is introduced into the corresponding inspection opening.

In each of the branches of the invention, the inspection system may include a control unit arranged to manage the authorisations to be sent for the interrogator device. In particular, the control unit may be arranged to determine the power at which the interrogator device is enabled to emit. According to the first branch of the invention, the control unit is then connected to the interrogator device, so as to be able to receive a radio-frequency response signal from the positioning RFID tag and consequently to enable sending at a power above or equal to the second threshold. According to the second branch of the invention, the control unit is connected to the positioning sensor, so as to be able to receive a signal indicating that the positioning sensor has detected the positioning marker. In this case, the interrogator device is enabled to emit at a power above or equal to the predetermined threshold.

The inspection system may also include a switch, for example in the form of a pushbutton, connected to the control unit. The control unit can then be configured so that the actuation of the switch triggers a prior check on the authorisation to send and, where applicable, the sending of a radio-frequency interrogation signal with a power above or equal to the second threshold or the predetermined threshold.

According to a particular embodiment, the control unit is arranged so as to determine, at regular intervals of time, whether or not the interrogator device is enabled to send at a power above or equal to the second threshold or the predetermined threshold.

The interrogator device may be mounted on a box so as to form a portable inspection apparatus. The RFID antenna must be arranged so as to extend outside the box and to be able to be introduced into an inspection opening. The inspection apparatus further includes, where applicable, the control unit and/or the positioning sensor. It may also include a battery and a display. The battery makes it possible to supply all the components of the portable apparatus and to make it autonomous. The display makes it possible for example to display the information contained in the RFID tags that have come into communication with the interrogator device. It may also display information relating to the location of the positioning marker or of the positioning RFID tag.

According to a particular embodiment, the RFID tag contains information relating to an identification of the component that it equips, information relating to the service life of said component and/or information relating to the presence of a particular substance in the component. The RFID tag may in particular contain a serial number, a product number, an estimated service life of the component, a planned date of replacement of the component, and/or information relating to the presence of a hazardous or toxic substance.

The RFID antenna is arranged to be able to be introduced into the nacelle compartment through an inspection opening.

It thus has dimensions, and in particular a cross section, enabling it to pass through the nacelle wall through the inspection opening.

The nacelle compartment may include authorised zones, into which the RFID antenna is authorised to be introduced, and prohibited zones, into which the RFID antenna is not authorised to be introduced. A zone is preferably defined as authorised so as to authorise the interrogation of a set of RFID tags, or even all the RFID tags equipping the turbojet engine. A zone may be defined as prohibited when there exists a risk of degradation of the RFID antenna or of a component of the engine in the event of contact of one with the other. In particular, a prohibited zone may correspond to a turbojet engine core, which is liable to be raised to a high temperature. In order to avoid the introduction of the RFID antenna into a prohibited zone, the RFID antenna may have a length less than a distance separating the inspection opening from the prohibited zone.

According to a particular embodiment, the RFID antenna is an omnidirectional antenna. It consists for example of a quarter-wave antenna having a radiating wire able to be introduced into the inspection opening. The radiating wire typically has a cylindrical shape of revolution. The diameter of the radiating wire is then less than the diameter of the inspection opening or, where applicable, than the diameter of a circle inscribed in the inspection opening.

The RFID antenna is for example arranged so as to send and receive radio-frequency signals in a range of UHF frequencies lying between 860 MHz and 960 MHz.

It should be noted that the component-inspection system is adapted to the simultaneous inspection of a plurality of components each equipped with an RFID tag. The RFID antenna can be introduced just once into the nacelle compartment in order to recover the information contained in a plurality of RFID tags. In order to limit the risks of collision between the radio-frequency response signals emitted by a plurality of RFID tags, the inspection system may integrate a collision management mechanism. This mechanism consists for example of a collision management algorithm integrated in the interrogator device.

Another object of the invention is a method for inspecting components of a turbojet engine, the turbojet engine being housed in a nacelle compartment delimited by a nacelle wall, the nacelle wall including an inspection opening suitable for allowing passage of an endoscope probe, the turbojet engine including at least one component equipped with an RFID tag. According to the invention, the inspection method comprises:
  a step of introducing, in the inspection opening, an RFID antenna equipping an interrogator device able to communicate with the RFID tag,
  a step of checking that the RFID antenna is introduced into the inspection opening, and
  if the RFID antenna is effectively introduced into the inspection opening, a step of sending a radio-frequency interrogation signal with a power above or equal to a predetermined threshold.

The checking step includes for example a substep of sending, by the interrogator device, a radio-frequency interrogation signal with a power below or equal to a first threshold, a substep of receiving this signal by the positioning RFID tag disposed in the nacelle compartment, in proximity to the inspection opening, a substep of processing the signal and sending a radio-frequency response signal by the positioning RFID tag, and a substep of receiving the radio-frequency response signal by the interrogator device. The RFID antenna is then considered to be effectively introduced into the inspection opening when the interrogator device receives the radio-frequency response signal from the positioning RFID tag. The first threshold is strictly below the predetermined threshold, also referred to as the second threshold, so that the radio-frequency interrogation signal sent in the checking step has a power strictly lower than that of the radio-frequency interrogation signal sent after recognition of the introduction of the RFID antenna.

The predetermined threshold can in particular be determined so that, outside the nacelle compartment, after attenuation by the nacelle wall, the radio-frequency interrogation signal has a power below or equal to the first threshold, for example less than or equal to 2 W, preferably less than or equal to 500 mW. The predetermined threshold is for example between 2 W and 10 W.

Another object of the invention is an aircraft engine including a nacelle and a turbojet engine, the nacelle comprising a nacelle wall delimiting a nacelle compartment, the turbojet engine being housed in the nacelle compartment and comprising at least one component equipped with an RFID tag. The nacelle wall includes an inspection opening able to allow passage of an RFID antenna of an inspection system as described previously.

According to a particular embodiment, the nacelle wall includes a plurality of inspection openings each suitable for allowing passage of an endoscope probe, at least one of the inspection openings furthermore being suitable for allowing the introduction of the RFID antenna of the inspection system in an authorised zone. The aircraft engine then includes, in addition, for each inspection opening suitable for allowing the introduction of the RFID antenna in an authorised zone, a visual mark disposed on the nacelle wall, in proximity to said inspection opening. The visual mark indicates to an operator that the inspection opening is appropriate for introducing the RFID antenna.

According to another particular embodiment, compatible with the previous one, the nacelle wall includes a plurality of inspection openings each suitable for allowing the passage of an endoscope probe, at least one of the inspection openings furthermore being suitable for allowing the introduction of the RFID antenna of the inspection system in a prohibited zone. The aircraft engine then includes, in addition, for each inspection opening suitable for allowing the introduction of the RFID antenna in a prohibited zone, a visual mark disposed on the nacelle wall, in proximity to said inspection opening. The visual mark indicates to an operator that the inspection opening is inappropriate for introducing the RFID antenna.

Still according to a particular embodiment, compatible with the previous ones, the nacelle wall includes a plurality of inspection openings each suitable for allowing passage of an endoscope probe, at least one of the inspection openings furthermore being suitable for allowing the introduction of the RFID antenna of the inspection system in an authorised zone and at least one of the inspection openings being suitable for allowing the introduction of the RFID antenna in a prohibited zone. The aircraft engine then furthermore includes, for each inspection opening suitable for allowing the introduction of the RFID antenna in a prohibited zone, a foolproof device arranged to allow passage of an endoscope probe and to prevent passage of the RFID antenna.

BRIEF DESCRIPTION OF THE DRAWINGS

Other features, details and advantages of the invention will emerge from a reading of the following description given solely by way of example and made with reference to the accompanying drawings, for which.

DETAILED DISCLOSURE OF PARTICULAR EMBODIMENTS

Figure 1:
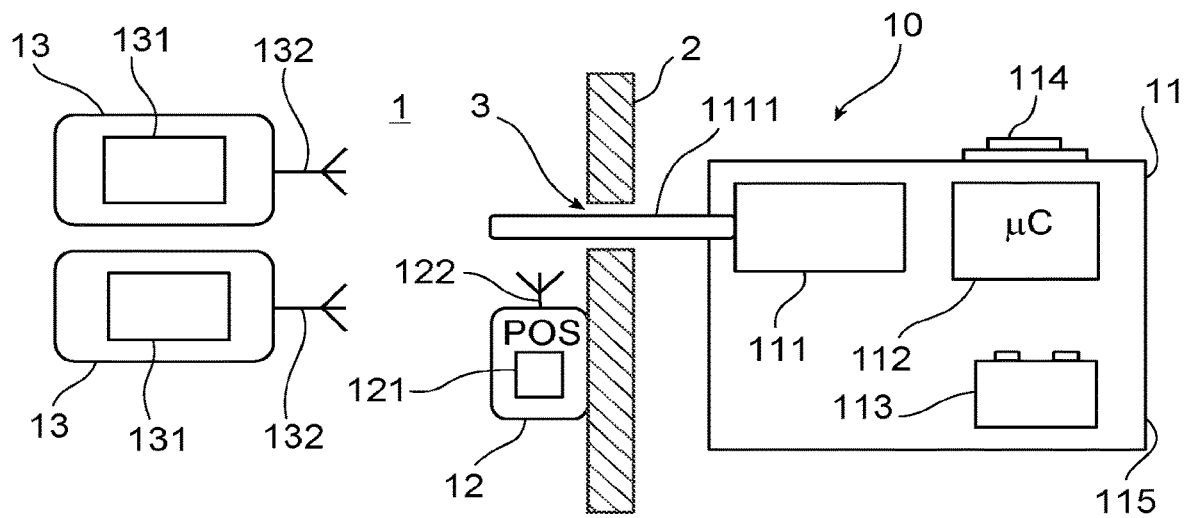
FIG. 1 shows schematically a first example of a system for inspecting components of a turbojet engine according to the invention.

FIG. 1 shows schematically a first example of a system for inspecting components of a turbojet engine according to the invention. The turbojet engine comprises a set of components and/or parts, not shown, disposed in a nacelle compartment 1. This nacelle compartment 1 is delimited by a nacelle wall 2. The nacelle wall 2 includes one or more inspection openings 3 each suitable for allowing passage of an endoscope probe. An inspection opening 3 includes for example an orifice emerging on either side of the nacelle wall, so as to be able to make the nacelle compartment communicate with the outside. Each inspection opening may furthermore include a valve able to adopt an open position and a closed position.

The inspection system 10 comprises an inspection apparatus 11, a positioning RFID tag 12 and a set of RFID tags 13. The positioning RFID tag 12 is associated with an inspection opening 3. It is disposed in the nacelle compartment 1, in proximity to the inspection opening 3. The positioning RFID tag 12 comprises an electronic chip 121 and an antenna 122. The electronic chip 121 contains information relating to the inspection opening 3, for example an identification number of the inspection opening. Each RFID tag 13 is associated with a component or a part of the turbojet engine. It is for example adhesively bonded, welded or otherwise fixed to the component or to the part. It comprises an electronic chip 131 containing information relating to the component or to the part with which it is associated and an antenna 132. The information relating to the component or to the part relates for example to an identification of the component, to the service life thereof, or to the fact that it contains one or more hazardous or toxic substances. The inspection apparatus 11 comprises an interrogator device 111, a control unit 112, a battery 113, a switch 114 and a box 115. The interrogator device 111, also referred to as an "RFID reader", comprises an RFID antenna 1111 and is arranged to be able to communicate with the positioning RFID tag 12 and the RFID tags 13. In particular, it is arranged to be able to emit a radio-frequency (RF) interrogation signal able to trigger the sending, by each RFID tag 12, 13 that has received this signal, of a response RF signal encoding the information contained in its electronic chip 121, 131. The control unit 112 is configured for determining the power level of the interrogation RF signal able to be sent by the interrogator device 111 according to the reception of the response RF signal from the positioning RFID tag 12. When the inspection apparatus 11 has not received the response RF signal from the positioning RFID tag 12, the control unit 112 limits the power of the interrogation RF signal sent by the interrogator device 111. The power of the signal is for example fixed at 100 mW or 200 mW. After reception of the response RF signal from the positioning RFID tag 12, the control unit enables a higher signal power, for example equal to 1 W or 2 W. The battery 113 is arranged to be able to supply the various elements of the inspection apparatus 11, in particular the interrogator device 111 and the control unit 112. It makes it possible to make the inspection apparatus 11 autonomous. The switch 114 is connected to the control unit 112. It makes it possible to trigger an interrogation of the RFID tags 12, 13, that is to say the sending of an interrogation RF signal. The box 115 is arranged to support all the elements of the inspection apparatus 11.

According to one particularity of the invention, the RFID antenna 1111 of the interrogator device 111 is arranged to be able to be introduced into the nacelle compartment 1 through the inspection opening 3. The RFID antenna 1111 includes for example a radiating wire forming a cylinder of revolution, the diameter of which is less than the diameter of the orifice of the inspection opening. The nacelle wall 2 generally has an at least partially conductive structure, so that the RF signals passing through it are considerably attenuated. Thus, when the RFID antenna 1111 is positioned outside the nacelle compartment 1, an interrogation RF signal is not normally detected by the positioning RFID tag 12 and the interrogator device 111 does not receive any response RF signal. On the other hand, when the RFID antenna 1111 is inserted in the nacelle compartment 1, the interrogation RF signal is easily detected by the positioning RFID tag 12, which in return resends a response RF signal that is detected by the interrogator device 111. The inspection system 10 is thus arranged so that the inspection apparatus 11 can determine whether or not the RFID antenna 1111 is inserted in the nacelle compartment 1. When the RFID antenna 1111 is not inserted, the interrogator device 111 is solely enabled to send an RF signal of relatively low power and the risks of interference with other devices, for example equipment of the aircraft equipped with the turbojet engine or equipment of another aircraft, are limited. When the RFID antenna 1111 is inserted in the nacelle compartment 1, the interrogator device 111 is then enabled to send an RF signal of higher power. This RF signal makes it possible to reach RFID tags relatively distant from the inspection opening 3 or masked by components that attenuate the signal. The risks of interference remain further limited because the interrogation RF signal is highly attenuated by the nacelle wall 2.

Figure 2:
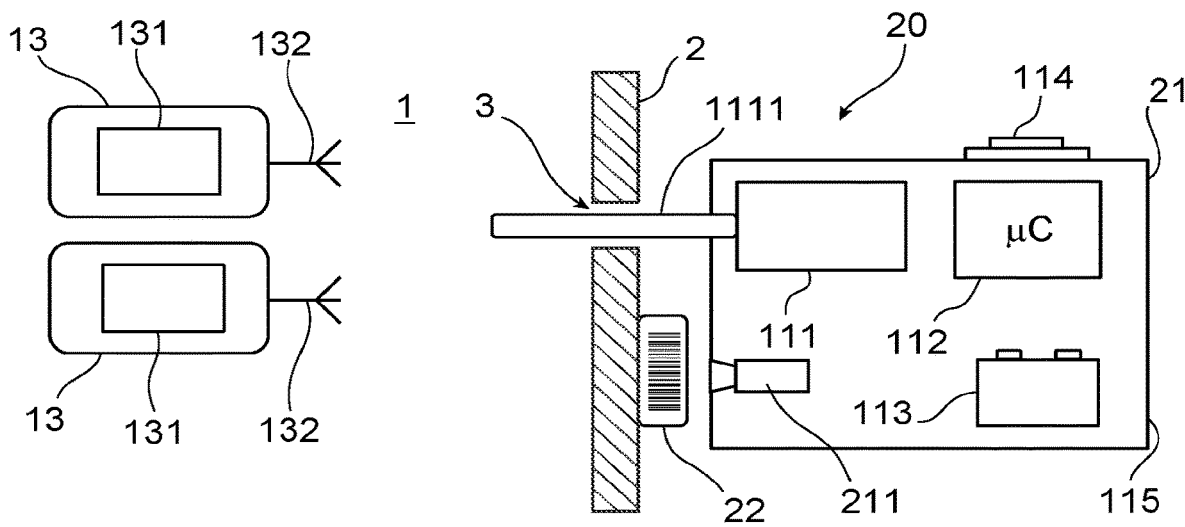
FIG. 2 shows schematically a first example of a system for inspecting components of a turbojet engine according to the invention.

FIG. 2 shows schematically a second example of a system for inspecting components of a turbojet engine according to the invention. This inspection system 20 is also adapted for equipping a turbojet engine of an aircraft comprising a set of components and/or parts disposed in a nacelle compartment 1. The nacelle compartment 1 is delimited by a nacelle wall 2 provided with an inspection opening 3. The inspection system 20 is distinguished from that of FIG. 1 in that it is arranged to be able to determine whether or not the RFID antenna is inserted in the nacelle compartment 1 by means of an assembly comprising a bar code and a bar code reader. The inspection system 20 thus comprises an inspection apparatus 21, a bar code 22 and a set of RFID tags 13. The bar code 22 is associated with the inspection opening 3. It is disposed on an external surface of the nacelle wall 2, in proximity to the inspection opening 3. The bar code 22 encodes information relating to the inspection opening 3, for example an identification number of the inspection opening 3 or information according to which the inspection opening 3 can be used for collecting data from RFID tags disposed in the nacelle compartment 1. The RFID tags 13 are each associated with a component or a part of the turbojet engine and contain information relating to these components or parts. The inspection apparatus 21 comprises an interrogator device 111 with its RFID antenna 1111, a control unit 112, a battery 113, a switch 114 and a box 115. It further includes an optical reader able to read bar codes. This optical reader is referred to as a "bar code reader 211" and is disposed alongside the RFID antenna 1111, so as to be able to read the bar code 22 when the RFID antenna 1111 is inserted in the inspection opening 3. The control unit 112 is considered to determine whether or not the interrogator device 111 is enabled to send an interrogation RF signal according to the reading of the bar code 22. When the bar code reader 211 has not read the bar code 22, the interrogator device 111 is not enabled to send an interrogation RF signal. Once the bar code reader 211 has read the bar code 22, the interrogator device 111 is enabled to send an interrogation RF signal. Since the RFID antenna 1111 is then situated in the nacelle compartment 1, the power of the interrogation RF signal may be relatively high, for example equal to 1 W or 2 W. The switch 114 is connected to the control unit 112 and makes it possible initially to trigger a reading by the bar code reader 211 and, in the event of reading of the bar codes 22, the sending of an interrogation RF signal to the RFID tags 13.

In the examples in FIGS. 1 and 2, a single inspection opening is shown. Naturally the nacelle wall may include a plurality of inspection openings each being associated with a positioning RFID tag and/or a bar code. Moreover, the system for inspecting components according to the invention may include any number of RFID tags associated with components to be inspected. It may include a single RFID tag or several tens. Moreover, the inspection apparatus may furthermore include a display able to display information relating to the information contained in the RFID tags and/or cable or wireless communication means for transmitting this information to a third-party device, for example a computer.

Figure 3:
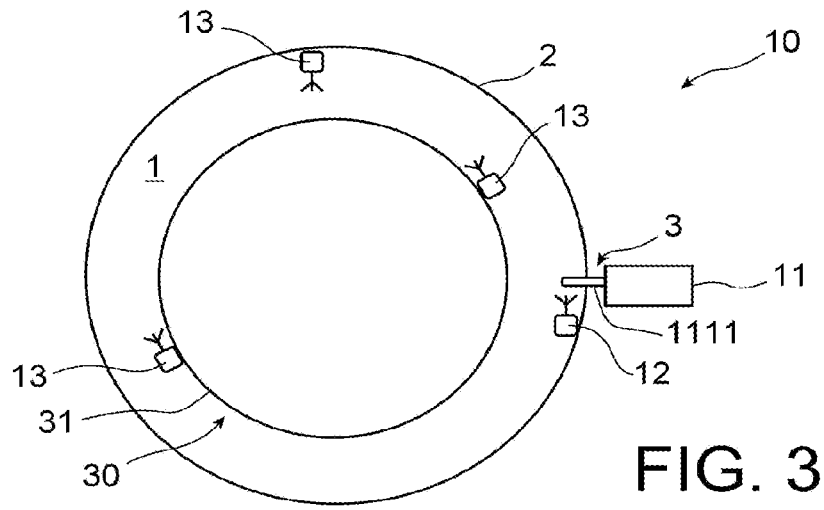
FIG. 3 shows schematically, in a view in cross section, an aircraft turbojet engine equipped with the inspection system described with reference to FIG. 1.

FIG. 3 shows schematically, in a view in cross section, an aircraft turbojet engine equipped with the inspection system described with reference to FIG. 1. The turbojet engine 30 has a core 31 formed by a set of components and parts liable to be raised to high temperatures. The turbojet engine 30 is housed in a nacelle compartment 1 comprising a nacelle wall 2. An inspection opening 3 is formed in the nacelle wall 2. The component-inspection system 10 includes the inspection apparatus 11, the positioning RFID tag 12 and three RFID tags 13. The RFID tags 13 are disposed in the nacelle compartment 1. The positioning RFID tag 12 is also disposed in the nacelle compartment 1 but in proximity to the inspection opening 3. In order to prevent the RFID antenna 1111 of the interrogator device 111 from coming into contact with the core 31 of the turbojet engine 30, the length thereof is determined so as to be less than the distance separating the nacelle wall 2 from the core 31.

Figure 4:
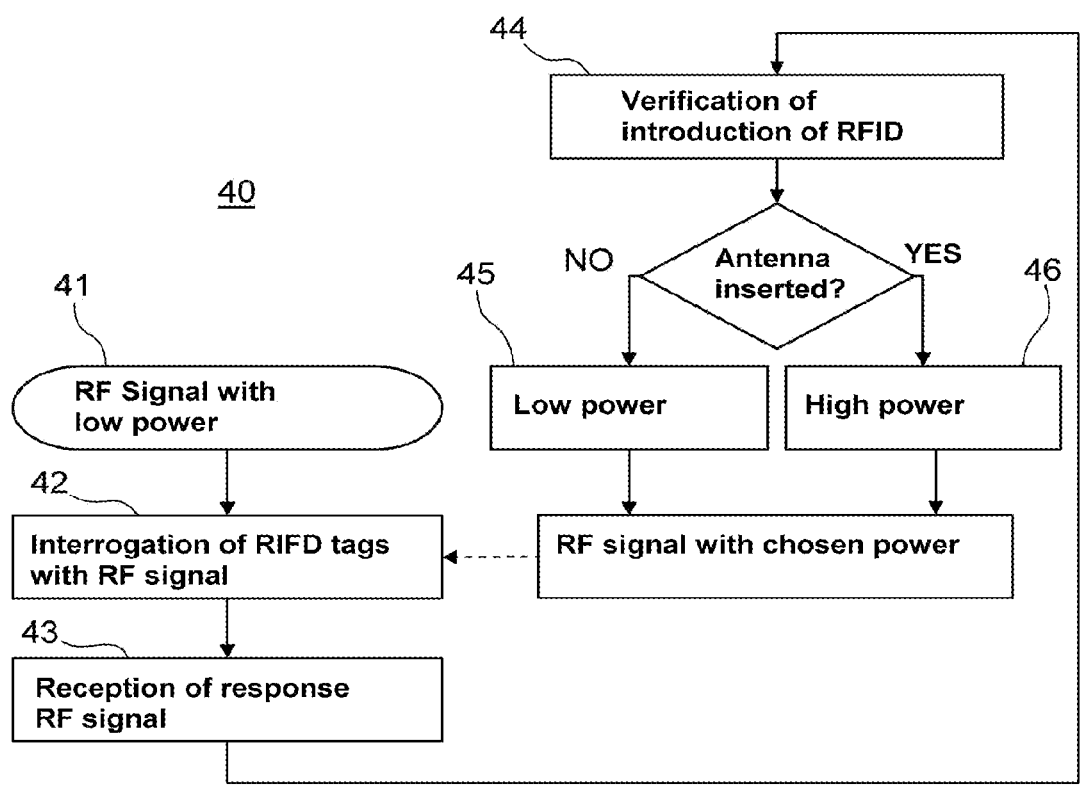
FIG. 4 shows an example of a method for inspecting components of a turbojet engine according to the invention.

FIG. 4 illustrates steps of an example of a method for inspecting components of a turbojet engine according to the invention. The method is described with reference to the inspection system in FIG. 1. The inspection method 40 includes an initialisation step 41 wherein a low power is allocated to the interrogation RF signal. The power is for example fixed at 100 mW. In a second step 42, an interrogation RF signal is sent by the interrogator device 111. The RF signal then has low power. The second step is for example triggered by the actuation of the switch 114. In a third step 43, a response RF signal is received coming from each of the RFID tags 12, 13 that received the interrogation RF signal. In a fourth step 44, it is checked whether the RFID antenna is inserted in the nacelle compartment 1. This step consists of determining whether a response RF signal has been received from the positioning RFID tag 12. If this signal has not been received, the low power remains allocated to the interrogation RF signal. This allocation is represented by a step 45. A new step 42 of sending an interrogation RF signal can then be performed in order to attempt a new communication with the positioning RFID chip 12. Alternatively, the method may be ended. On the other hand, if a response RF signal has been received from the positioning RFID tag 12, a high power, for example fixed at 1 W, is allocated to the interrogation RF signal in a step 46. A new step 42 of sending an interrogation RF signal is then performed in order to be able to interrogate all the RFID tags 13 situated in the nacelle compartment 1. The response RF signals can then be transmitted to the control unit 112 and, where applicable, to other items of apparatus.

The invention claimed is:

1. An inspection system for inspecting components of a turbojet engine, the turbojet engine being housed in a nacelle compartment delimited by a nacelle wall, the nacelle wall including an inspection opening suitable for allowing passage of an endoscope probe, the turbojet engine including at least one component equipped with an RFID tag, the inspection system comprising an interrogator device equipped with an RFID antenna, the interrogator device being arranged to be able to communicate with the RFID tag with the RFID antenna, the RFID antenna being arranged to be able to be introduced into the nacelle compartment through the inspection opening.

2. The inspection system according to claim 1, further comprising a positioning RFID tag disposed in the nacelle compartment so as to be able to be detected by the interrogator device when the RFID antenna is introduced into the nacelle compartment through the inspection opening, the inspection system being configured to enable the interrogator device to send a radio-frequency interrogation signal with a power below or equal to a first threshold when it has not detected the positioning RFID tag and to enable the interrogator device to send a radio-frequency interrogation signal with a power above or equal to the second threshold when it has detected the positioning RFID tag, the second threshold being strictly higher than the first threshold.

3. The inspection system according to claim 2, wherein the first threshold is between 50 mW and 2 W.

4. The inspection system according to claim 2, wherein the second threshold is determined so that, outside the nacelle compartment, after attenuation by the nacelle wall, the radio-frequency interrogation signal has a power below or equal to the first threshold.

5. The inspection system according to claim 2, wherein the second threshold is between 2 W and 10 W.

6. The inspection system according to claim 1, further comprising a positioning marker and a positioning sensor both arranged so that the positioning marker is detected by the positioning sensor when the RFID antenna is introduced into the nacelle compartment through the inspection opening, the inspection system being configured so as to enable the interrogator device to send a radio-frequency interrogation signal with a power above or equal to a predetermined threshold only when the positioning sensor has detected the positioning marker.

7. The inspection system according to claim 6, configured to enable the interrogator device to send a radio-frequency interrogation signal only when the positioning sensor has detected the positioning marker.

8. The inspection system according to claim 6, wherein the positioning marker is a bar code or a 2D code and the positioning sensor is an optical reader able to read a bar code or a 2D code.

9. The inspection system according to claim 8, wherein the bar code or the 2D code is disposed on an external surface of the nacelle wall, in proximity to the inspection opening, the optical reader being disposed in the vicinity of the RFID antenna.

10. The inspection system according to claim 1, wherein the RFID tag contains information relating to the identification of the component that it equips, information relating to a service life of said component and/or information relating to the presence of a particular substance in said component.

11. The inspection system according to claim 1, wherein, the turbojet engine including authorised zones wherein the RFID antenna is authorised to be introduced, and prohibited zones wherein the RFID antenna is not authorised to be introduced, said RFID antenna has a length less than a distance separating the inspection opening from the prohibited zone.

12. A method for inspecting components of a turbojet engine, the turbojet engine being housed in a nacelle compartment delimited by a nacelle wall, the nacelle wall including an inspection opening able to allow passage of an endoscope probe, the turbojet engine including at least one component equipped with an RFID tag, the inspection method comprising:

a step of introducing, into the inspection opening, an RFID antenna equipping an interrogator device able to communicate with the RFID tag, a step of verifying that the RFID antenna is introduced into the inspection opening, and if the RFID antenna is effectively introduced into the inspection opening, a step of sending a radio-frequency interrogation signal with a power above or equal to a predetermined threshold.

13. An aircraft engine including a nacelle and a turbojet engine, the nacelle comprising a nacelle wall delimiting a nacelle compartment, the turbojet engine being housed in the nacelle compartment and comprising at least one component equipped with an RFID tag, the nacelle wall including an inspection opening able to allow passage of an RFID antenna of an inspection system according to claim 1.

14. The aircraft engine according to claim 13, wherein the nacelle wall includes a plurality of inspection openings each suitable for allowing passage of an endoscope probe, at least one of the inspection openings furthermore being suitable for allowing the introduction of the RFID antenna of the inspection system into an authorised zone, the aircraft engine furthermore including, for each inspection opening suitable for allowing the introduction of the RFID antenna into an authorised zone, a visual mark disposed on the nacelle wall, in proximity to said inspection opening, the visual mark indicating to an operator that the inspection opening is appropriate for introducing the RFID antenna.

15. The aircraft engine according to claim 13, wherein the nacelle wall includes a plurality of inspection openings each suitable for allowing passage of an endoscope probe, at least one of the inspection openings furthermore being suitable for allowing the introduction of the RFID antenna of the inspection system into an authorised zone and at least one of the inspection openings being suitable for allowing the introduction of the RFID antenna into a prohibited zone, the aircraft engine furthermore including, for each inspection opening suitable for allowing the introduction of the RFID antenna into a prohibited zone, a foolproof device arranged to allow passage of an endoscope probe and to prevent passage of the RFID antenna.

* * * * *